United States Patent [19]

Spiess

[11] 4,215,572

[45] Aug. 5, 1980

[54] APPARATUS AND METHOD FOR SUPPORTING OCEANOGRAPHIC EQUIPMENT AT SELECTED OCEAN DEPTHS

[75] Inventor: Fred N. Spiess, La Jolla, Calif.

[73] Assignee: The United States of America as represented by the Secretary of the Navy, Washington, D.C.

[21] Appl. No.: 936,450

[22] Filed: Aug. 24, 1978

[51] Int. Cl.² .................. G01W 1/00; B63B 21/52
[52] U.S. Cl. .................................. 73/170 A; 9/8 R; 114/293
[58] Field of Search ................... 9/8 R, 8.3 E; 114/144 B, 326, 331, 257, 293; 405/199, 200; 182/142, 143, 144; 254/135 R, 175.3; 73/170 R, 170 A

[56] References Cited

U.S. PATENT DOCUMENTS

| | | | |
|---|---|---|---|
| 2,572,255 | 10/1951 | Gallaway | 9/8 R |
| 3,402,687 | 9/1968 | Kiyoshitsuji | 114/331 |
| 3,586,125 | 6/1971 | Durand | 182/142 |

Primary Examiner—Charles E. Frankfort
Attorney, Agent, or Firm—Richard S. Sciascia; Thomas M. Phillips

[57] ABSTRACT

An array of oceanographic instruments is supported on a tension line extending horizontally at a selected ocean depth between a pair of vertical lines one of which is a ship-borne, end-weighted, winched cable and the other a float-supported and anchored guide line. To hold the array at a selected level, a buoyant package is moved along the guide line to a selected location where it grips the line and exerts its positive buoyant force. By matching positive buoyancy of the package to the negative buoyancy of the weighted cable, opposing, tension-producing forces are applied to the tension line to hold it in its horizontal disposition. The motive power for the buoyant package is supplied by the ship through its cable and the coupled tension line. The horizontal disposition of the array initially is achieved by moving both the cable and the buoyant package to the selected level.

7 Claims, 5 Drawing Figures

APPARATUS AND METHOD FOR SUPPORTING OCEANOGRAPHIC EQUIPMENT AT SELECTED OCEAN DEPTHS

BACKGROUND OF THE INVENTION

The invention relates to the deployment of oceanographic equipment or instruments and, in particular, to systems for supporting instrument arrays horizontally at particular ocean levels.

In oceanography and ocean engineering projects, arrays of instrument or equipment are deployed at particular depths and, as the occasion demands, moved from one depth location to another. The term 'depth', as presently used, is intended to designate a particular sub-surface ocean level. In practice when only one or two instruments are to be deployed, the support for the instruments usually presents no particular problem. However, difficulties arise when the operation calls for the deployment of relatively long, horizontal arrays, such, perhaps, as a series of instruments all of which are to be held horizontally at a particular depth and all of which, in operation, are to be moved as a unit to another depth location. If, for example, the array is strung on a horizontal line, the problem is one of securely supporting the ends of the line at the desired depth and of maintaining the set position especially when subjected to heavy underwater currents. In fact, as far as is known, there has been no simple, economical and effective system for supporting these long arrays.

It is, therefore, a principal object of the invention to provide a simple, reliable support system for these long, horizontal arrays as well as other types of arrays or, if desired, single instruments. Related objects are to assure that the array is held in its desired location and to provide a capability of moving the array as a unit during operation.

BRIEF DESCRIPTION OF THE DRAWINGS

The invention is illustrated in the accompanying drawings of which.

DETAILED DESCRIPTION OF THE INVENTION

Figure 1:
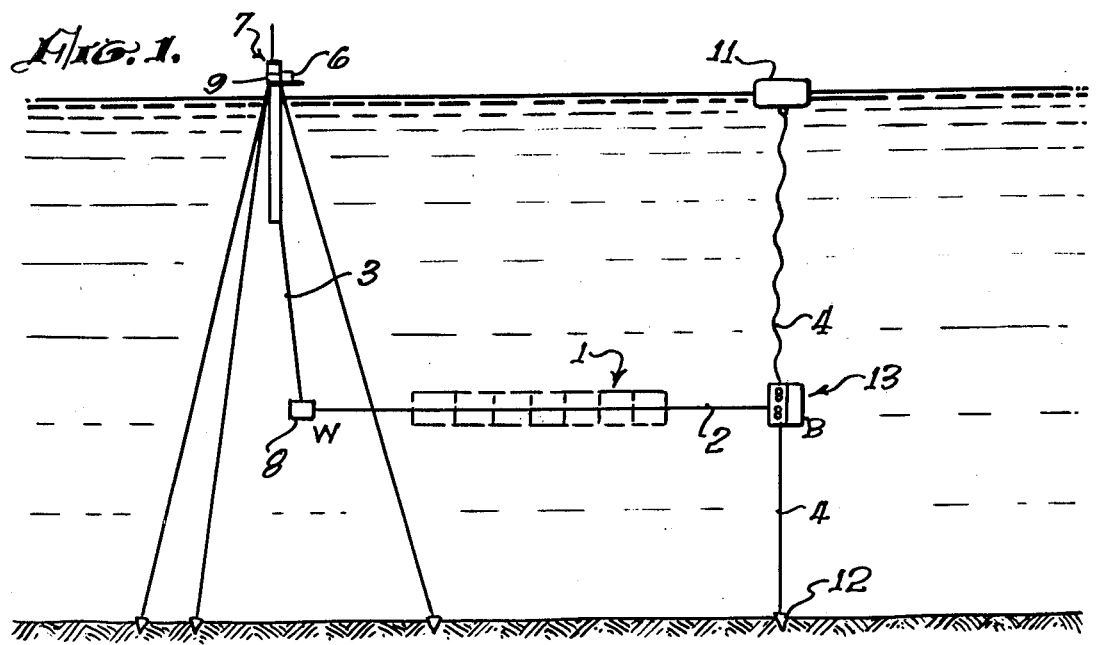
FIG. 1 schematically illustrates the present support arrangement and its operation.

In FIG. 1 an array 1 of oceanographic instruments or equipment is supported by a tension line 2 which, in turn, is supported by ship-borne cable 3 and a buoyant guide line 4. Although the array itself may be of any desired configuration, for present purposes it can be considered as a plurality of neutrally-buoyant oceanographic instruments or sensors. In the present invention the relatively long array is to be supported and held horizontally at a predetermined depth and to be movable as a unit from one selected depth to another in accordance with operational requirements.

To achieve these ends, horizontal line 2 is held in tension with equal and opposite forces applied to it through its connections to end-weighted cable 3 and guide line 4. As shown, cable 3 is a free or unanchored line carried by a winch 6 which, in turn, is carried by an ocean platform or ship 7. The ship shown in FIG. 1 is a special type of oceanographic vessel known as "Flip", a name which indicates its capability of being flipped from a horizontal underway disposition into the illustrated moored vertical mode. At its three point moor it provides an unusually stable oceanographic platform. Other vessels or platforms obviously can be used. Line or cable 3 carries a weight 8 with tension line 2 being coupled to cable 3 at the weight. In actual practice, however, line 2 can, if desired, be an extension of cable 3 and, operationally, the precise junction of the two is not critical. For reasons to be described, cable 3 and line 2 both are coaxial, strain cables capable of carrying power derived from Flip's generator 9 to the array and to other components to be described.

Guide line 4 is a floating rope line or the like having sufficient strength to resist breaking under applied forces. It is buoyantly supported at its upper end by a buoy or float 11 and, as shown, is secured by anchor 12. Operationally, float 11 can be located at any desired distance from ship 7 although, as will become apparent, the separation between "Flip" and guide line anchor 12 determines to some extent the tension in line 2 and thus its resistance to towing in a given current.

The tension in line 2 is produced by the negative buoyancy of weight 8 acting on one of its ends and the positive buoyancy of a buoyant package or line-crawler 13 acting on its other end. By a proper choice of the in-water weight (W) of cable weight 8 and the positive buoyancy (B) of the line-crawling package, horizontal line 2 is placed in tension with substantially equal force components tending to hold it in its desired location.

Line-crawling package 13 is shown in some detail in FIGS. 2–5. Functionally considered, it includes a flotation unit or ballast 14 (FIG. 3) exerting a strong upward force on guide line 4. To apply the force, line 4 is wound around two pairs of sheaves 16—16' and 17—17' (FIG. 2) in such a manner that the sheaves firmly grip the line and function as a line puller. As a further feature, the buoyant package is, in effect, a line-crawler in that it is movable along line 4 to any desired location or, in other words, ocean depth. Tension line 2 is coupled directly to the package so that the array moves with the package.

Figure 4:
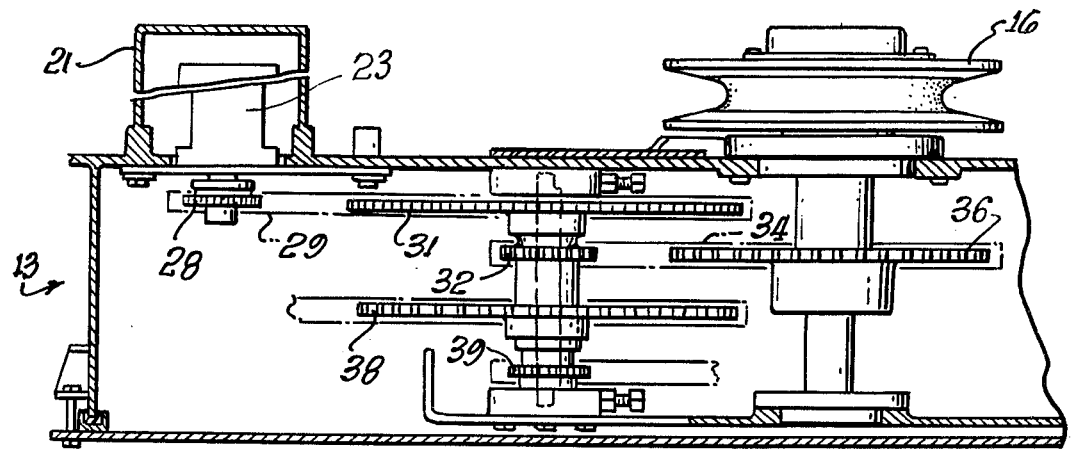
FIGS. 4 and 5 are sections taken along lines 4—4 and 5—5 of FIG. 2.
Figure 5:
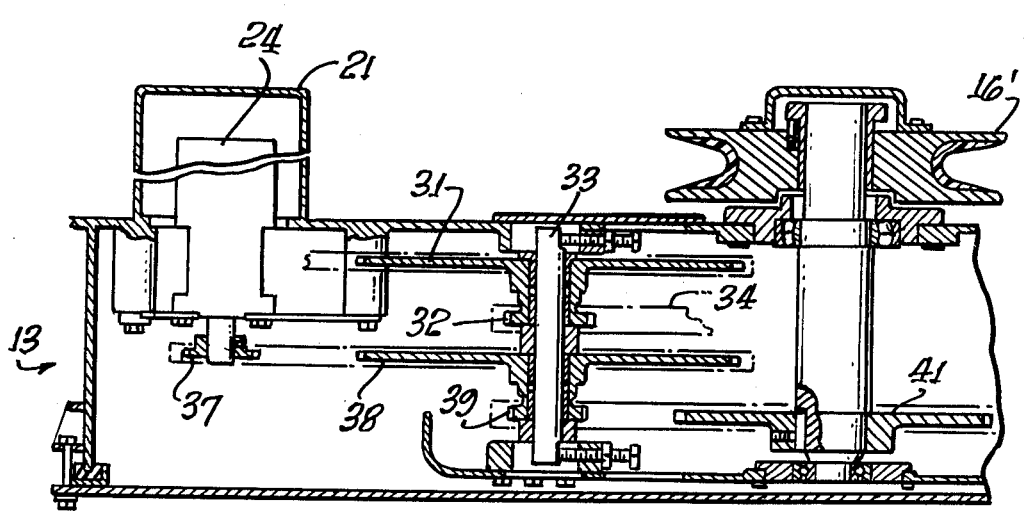

One arrangement for driving the sheaves and moving the package along the line is illustrated in FIGS. 4 and 5 which will be described. However, as will be appreciated, other driving arrangements can be used. For example, pairs of soft rollers can be used to grip the line much in the manner of a wringer or a "car puller". For present purposes, however, such an arrangement is beneficial in that it employs the separate pairs of grippers which substantially increases the amount of tension that can be applied. In practice, tension forces of 10,000 pounds are achieved. This figure is significant since the resistance to towing in a given current is a function of the amount of applied tension.

Figure 2:
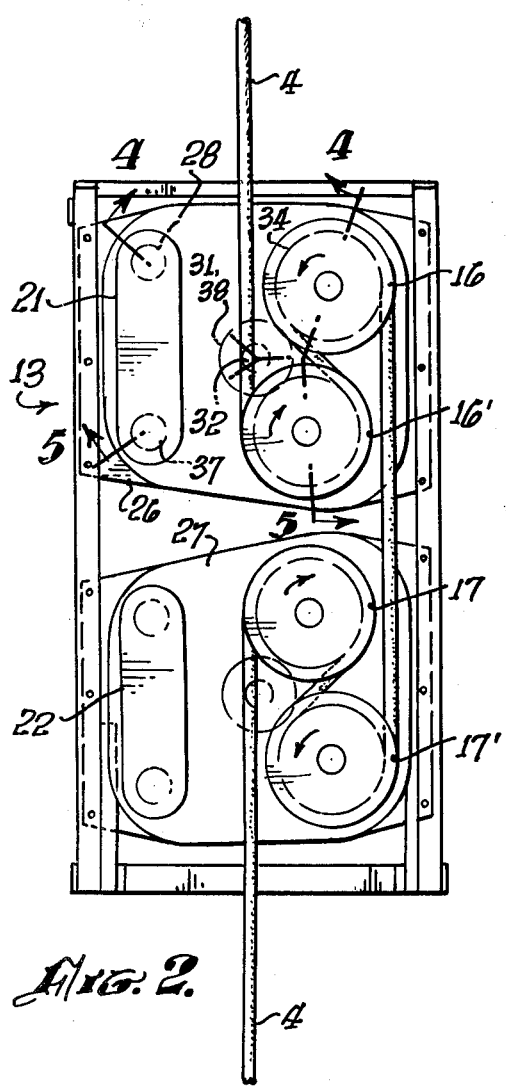
FIG. 2 is a side elevation of a particular line-crawling buoyant package used to support the array.
Figure 3:
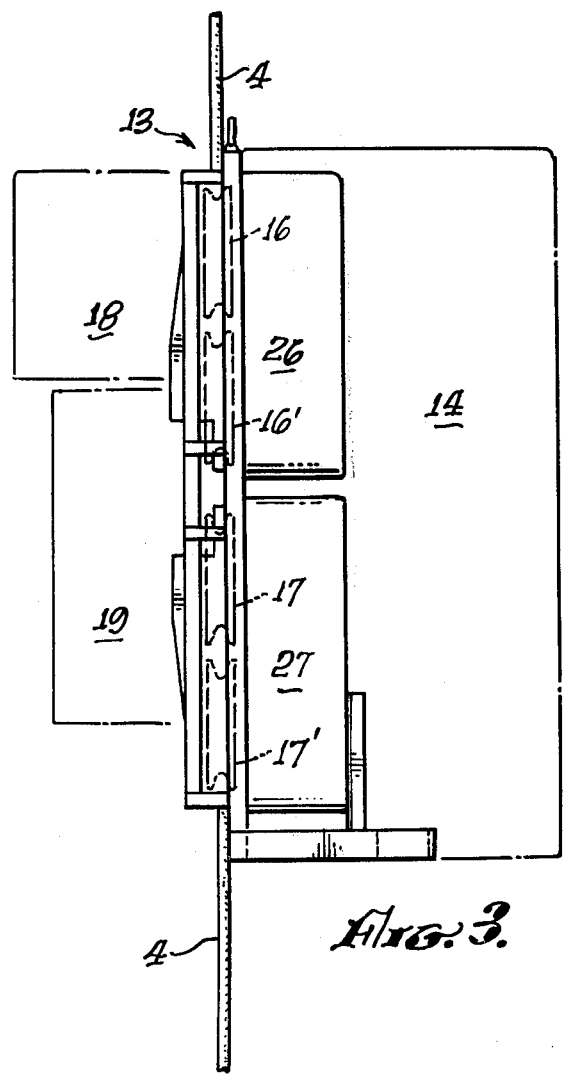
FIG. 3 is an end view of the FIG. 2 package.

Power for driving the sheaves preferably is supplied through coaxial cables 2 and 3 with cable 2 being electrically coupled to an electrical motor carried in an electrical and electronics package 18 of the line crawler. The motor, in turn, drives hydraulic pumps of hydraulics package 19. The pumps drive hydraulic motors contained in motor casings 21 and 22 (FIG. 2). FIGS. 4 and 5 are sections on FIG. 2 showing the drive for one pair of sheaves 16 and 16'. FIG. 4 is the drive for sheave 16 while FIG. 5 is the drive for sheave 16'. Identical drives are employed for sheaves 17 and 17'.

Generally considered, there is a separate hydraulic motor for each of the sheaves. Thus, as shown in FIG. 4, motor 23 drives sheave 16 and, in FIG. 5, another motor 24 drives sheave 16'. Both motors are mounted in single motor casing 21 which, in turn, is mounted on line puller casing 26. The motors for sheaves 17 and 17' are contained in casing 22 (FIG. 2) mounted on another line puller casing 27.

Referring to FIG. 4, motor 23 drives a sprocket 28 having a chain 29 driving another sprocket 31 which, in a manner more clearly shown in FIG. 5, drives a sprocket 32 rotatably mounted on a central support shaft 33. Another chain 34 meshed with sprocket 32 drives sprocket 36 to rotatably drive sheave 16. The general arrangement or disposition of these sprockets is perhaps better seen in FIG. 2.

The drive for sheave 16' (FIG. 5) is essentially a duplication of the sheave 16 drive. It includes motor 24 and chain-driven sprockets 37 and 38, the latter being rotatably mounted on common shaft 33 to drive sprocket 16' through sprockets 39 and 41. As will be appreciated, the sprockets for sheaves 16 and 16' are independently rotatable on shaft 33 and their mounting includes appropriate bearing arrangements. By controlling the motor sheaves 16 and 16' can be driven in opposite directions. For example, to cause the line crawler 13 to move downwardly on guide line 4, the sprockets are driven in the directions shown by the arrows of FIG. 2. Drive in the opposite direction is achieved by rotatably driving the sheaves in opposite directions. Thus, the line crawler can be moved at will up or down guide line 4. However, because of the buoyancy of the package or line crawler, it is possible to omit the upward driving capability and, instead, permit it to move under its own buoyant force. Another possibility is the use of internal batteries as a source of the motive power. However, the use of coaxial cables 2 and 3 is considerably more practical and advantageous. One particular advantage is that the power also can be used for the oceangraphic instruments or equipment forming the horizontal array.

In operation, vertical lines 3 and 4 are deployed in the manner shown in FIG. 1 and array 1 then lowered to a desired depth by paying out wire from winch 6. Simultaneously, line crawler 13 is driven along its guide line to cause the array and its tension line support to extend in the desired horizontal direction at the selected depth. Proper choice of the in-water weight or negative buoyancy of W relative to the positive buoyancy of B places tension on line 2. In other words, the negative buoyancy of weight W exerts a tension-producing force on line 2 opposite to the force exerted by the positive buoyancy of package 13. A balanced force holds the line in tension in a fixed position. The amount of the tension, as already noted, is a function of the forces exerted as well as the separation of Flip from anchor 12 of guide line 4. When it is desired to move the array to a new depth location, the line crawler again is moved concurrently with further deployment of cable 3 by its winch.

Aside from the functional advantages that have been described, it also will be recognized that the system is relatively simple and inexpensive. For one reason, it utilizes only one oceanographic vessel which itself usually is fitted with the necessary winch, generator and strain cable used in the system. The buoyant guide line is a simple anchored line. Consequently, the principle expense lies in the buoyant line puller or crawler 13 which can be provided in various manners depending on the tension force that is desired.

Obviously many modifications and variations of the present invention are possible in the light of the above teachings. It is therefore to be understood that within the scope of the appended claims the invention may be practiced otherwise than as specifically described.

What is claimed is:

1. A method for supporting oceanographic equipment at a selected ocean level comprising:
   vertically deploying from a surface platform an end-weighted line into a vertically-disposed freely-suspended disposition,
   vertically suspending an anchored line from a surface float spaced laterally of said platform,
   engaging said anchored line with a relatively movable package providing a positive buoyant force,
   supporting said equipment on a tension line coupling said end-weighted line to said movable buoyant package,
   movably positioning said buoyant package at said selected level, and
   deploying said freely-suspended end-weighted line to a level at which said tension line is substantially horizontal,
   said in-water weight of said end-weighted line having its negative buoyancy force matched to said positive buoyancy force of said buoyant package for producing equal and opposite tension-producing forces on said tension line whereby its horizontal disposition is maintained and said oceanographic equipment is supported at said selected level.

2. The method of claim 1 further including the step of:
   varying the selected level of said supported oceanographic equipment by varying the location on said float supported line of said buoyant package and concurrently varying the deployed level of said end-weighted line.

3. Apparatus for supporting oceanographic equipment at selected ocean levels comprising:
   a floatable platform,
   an unanchored end-weighted line suspendably carried by said platform in a freely-suspended disposition,
   means carried by said platform for deploying said line,
   a guide line,
   flotation means for supporting the guide line at a surface location spaced from said platform,
   anchor means for holding the guide line in a vertical disposition spaced from said suspended weighted line,
   a positively buoyant line-crawling package mounted on the guide line, and including:
   driving means for moving said package along the guide line to a selected location, and
   means for gripping said guide line at said location for exerting the positive buoyant force of the package on it, and
   a tension line coupling said end-weighted line to said buoyant package for providing support for said oceanographic equipment,
   whereby said line-crawling package can be disposed at a selected ocean level and said weighted line deployed to cause said tension line to extend in a horizontal direction at said selected level, said end-weighted line having its in-water negative buoyancy matched to the positive buoyancy of said buoyant package for exerting opposite tension-producing forces on said tension line whereby said horizontal disposition is maintained and said oceanographic equipment is supported at said selected level.

4. The apparatus of claim 3 wherein said tension line is coupled directly to said line-crawling package, said apparatus further including:
   a power supply means for said line-crawling package, said means including:
      a power source carried by said floating platform, and
      power-carrying means coupling said source to said package.

5. The apparatus of claim 4 wherein said line-crawling package includes:
   flotation means, and
   a motor,
   said package driving means including at least one pair of closely-spaced sheaves with said guide line being wound on said sheaves for producing said gripping force,
   said sheaves being separately driven rotatably for moving said package along said line in either vertical direction.

6. The apparatus of claim 5 wherein said power source is electrical and said power-carrying means includes said equipment-supporting tension line.

7. The apparatus of claim 6 wherein said oceanographic equipment includes an array of electrically-energized oceanographic instruments,
   said instruments being mounted on said tension line and being energized by said power carried by said line.

* * * * *